(12) United States Patent

Thundathil

(10) Patent No.: US 12,574,219 B2

(45) Date of Patent: Mar. 10, 2026

(54) ENHANCED VEHICLE SECURE ONBOARD COMMUNICATION PROTOCOL WITH ENCRYPTION

(71) Applicant: FCA US LLC, Auburn Hills, MI (US)

(72) Inventor: Jayakrishnan Thundathil, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 120 days.

(21) Appl. No.: 18/664,442

(22) Filed: May 15, 2024

(65) Prior Publication Data

US 2025/0358102 A1     Nov. 20, 2025

(51) Int. Cl.
| | |
|---|---|
| *H04L 9/08* | (2006.01) |
| *H04L 9/32* | (2006.01) |
| *H04L 12/40* | (2006.01) |

(52) U.S. Cl.
CPC .......... *H04L 9/0825* (2013.01); *H04L 9/3242* (2013.01); *H04L 12/40* (2013.01); *H04L 2012/40215* (2013.01); *H04L 2012/40273* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 9,923,722 | B2 * | 3/2018 | Nanjundappa | ......... G07C 5/008 |
| 10,419,408 | B1 * | 9/2019 | Herzberg | .............. H04L 9/3226 |
| 11,303,661 | B2 | 4/2022 | Galula et al. | |
| 11,516,194 | B2 | 11/2022 | Kim et al. | |
| 11,804,956 | B2 * | 10/2023 | Chaudhari | ............ H04L 9/0662 |
| 2008/0066184 | A1 * | 3/2008 | Ben-Ami | .............. H04L 9/3242 |
| | | | | 726/27 |
| 2014/0270163 | A1 * | 9/2014 | Merchan | ............... H04L 9/0869 |
| | | | | 380/46 |
| 2015/0156176 | A1 * | 6/2015 | Collinge | ............... H04L 63/062 |
| | | | | 713/168 |
| 2017/0302452 | A1 * | 10/2017 | Nanjundappa | ........ B60R 16/023 |
| 2018/0359226 | A1 * | 12/2018 | Martinez | ............ H04L 63/0442 |
| 2019/0207915 | A1 * | 7/2019 | Schaap | .................. H04L 9/0891 |
| 2021/0367930 | A1 * | 11/2021 | Wang | .................... H04L 9/3268 |

(Continued)

FOREIGN PATENT DOCUMENTS

| | | | | |
|---|---|---|---|---|
| CN | 101771973 | A | * | 7/2010 |
| DE | 102019202232 | A1 | | 8/2020 |

(Continued)

*Primary Examiner* — Ali H. Cheema

(74) *Attorney, Agent, or Firm* — Jeremy J. Klobucar

(57) ABSTRACT

A control system for a vehicle includes a first electronic control unit (ECU) configured to obtain data for communication to another ECU of the vehicle and to encrypt the data using a first key pair to obtain encrypted data, calculate a message authentication code (MAC) using a second key pair, append the MAC to the encrypted data to obtain a MAC-appended encrypted data, and transmit the MAC-appended encrypted data via a controller area network (CAN) of the vehicle, and a second ECU configured to receive the MAC-appended encrypted data from the first ECU via the CAN and to using the second key pair, attempt to verify the MAC and obtain the encrypted data, and in response to verifying the MAC using the second key pair, decrypt the encrypted data using the first key pair to obtain the data.

14 Claims, 3 Drawing Sheets

(56)                    References Cited

U.S. PATENT DOCUMENTS

| 2022/0353056 | A1  |   | 11/2022 | Wang   |                |
|--------------|-----|---|---------|--------|----------------|
| 2023/0275879 | A1* |   | 8/2023  | Schaap | ...... H04L 9/0891 |
|              |     |   |         |        | 713/181        |
| 2024/0064004 | A1* |   | 2/2024  | Osborn | ...... H04L 9/0819 |
| 2025/0156861 | A1* |   | 5/2025  | Osborn | ...... H04L 9/3242 |

FOREIGN PATENT DOCUMENTS

| JP | 2013081028 | A  | * | 5/2013 |                    |
|----|------------|----|---|--------|--------------------|
| JP | 2013081036 | A  | * | 5/2013 |                    |
| JP | 2013090046 | A  | * | 5/2013 |                    |
| KR | 102528441  | B1 | * | 5/2023 | ...... H04L 9/0869 |
| WO | WO-2020165067 | A1 | * | 8/2020 | ...... G05B 17/02  |
| WO | WO-2022013335 | A1 | * | 1/2022 | ...... H04L 67/5651 |

* cited by examiner

ENHANCED VEHICLE SECURE ONBOARD COMMUNICATION PROTOCOL WITH ENCRYPTION

FIELD

The present application generally relates to vehicle control architecture and networking and, more particularly, to techniques for an enhanced vehicle secure onboard communication (SecOC) protocol with encryption.

BACKGROUND

Today's vehicles include a plurality of different electronic control units (ECUs) that are interconnected via a software architecture, such as the AUTomotive Open System Architecture (AUTOSAR). Secure onboard communication (SecOC) is an AUTOSAR protocol where data being transmitted between ECUs is appended with a message authentication code (MAC), which can be based on a symmetric or asymmetric key pair. The receiving ECU uses the known key pair to authenticate the source (the sending ECU) of the MAC-appended data and the data's integrity. The data being transmitted between ECUs, however, is still visible to third parties (e.g., a "man-in-the-middle") and thus conventional AUTOSAR SecOC communications are not fully secure. This could become problematic as the number of vehicle ECUs increases and as more private user data is known and shared by the ECUs. Accordingly, while such conventional vehicle communication systems do work well for their intended purpose, there exists an opportunity for improvement in the relevant art.

SUMMARY

According to one example aspect of the invention, a control system for a vehicle is presented. In one exemplary implementation, the control system comprises a first electronic control unit (ECU) configured to obtain data for communication to another ECU of the vehicle and to encrypt the data using a first key pair to obtain encrypted data, calculate a message authentication code (MAC) using a second key pair, append the MAC to the encrypted data to obtain a MAC-appended encrypted data, and transmit the MAC-appended encrypted data via a controller area network (CAN) of the vehicle, and a second ECU configured to receive the MAC-appended encrypted data from the first ECU via the CAN and to using the second key pair, attempt to verify the MAC and obtain the encrypted data, and in response to verifying the MAC using the second key pair, decrypt the encrypted data using the first key pair to obtain the data.

In some implementations, the first and second key pairs are a same key pair such that there is no additional key negotiation between the first and second ECUs. In some implementations, the first and second key pairs are a same symmetric key pair. In some implementations, the first and second key pairs are a same asymmetric key pair. In some implementations, the MAC-appended encrypted data is visible to a third party that does not have the first key pair. In some implementations, the data includes private user data for a user associated with the vehicle, and wherein the encryption of the data prevents the third party from obtaining the private user data. In some implementations, the calculating, appending, and verification of the MAC is based on the AUTOSAR secure onboard communication (SecOC) protocol. In some implementations, the first ECU is further configured to append a freshness counter to the encrypted data while appending the MAC to the encrypted data. In some implementations, the second ECU is further configured to attempt to verify the MAC based on the freshness counter.

According to another example aspect of the invention, a method of operating a control system for a vehicle is presented. In one exemplary implementation, the method comprises obtaining, by a first ECU of the vehicle, data for communication to another ECU of the vehicle, encrypting, by the first ECU, the data using a first key pair to obtain encrypted data, calculating, by the first ECU, an MAC using a second key pair, appending, by the first ECU, the MAC to the encrypted data to obtain a MAC-appended encrypted data, transmitting, from the first ECU via a CAN of the vehicle, the MAC-appended encrypted data, receiving, by a second ECU and from the first ECU via the CAN, the MAC-appended encrypted data, using the second key pair, by the second ECU, attempting to verify the MAC and obtain the encrypted data, and in response to verifying the MAC using the second key pair, decrypting, by the second ECU, the encrypted data using the first key pair to obtain the data.

In some implementations, the first and second key pairs are a same key pair such that there is no additional key negotiation between the first and second ECUs. In some implementations, the first and second key pairs are a same symmetric key pair. In some implementations, the first and second key pairs are a same asymmetric key pair. In some implementations, the MAC-appended encrypted data is visible to a third party that does not have the first key pair. In some implementations, the data includes private user data for a user associated with the vehicle, and wherein the encryption of the data prevents the third party from obtaining the private user data. In some implementations, the calculating, appending, and verification of the MAC is based on the AUTOSAR SecOC protocol. In some implementations, the method further comprises appending, by the first ECU, a freshness counter to the encrypted data while appending the MAC to the encrypted data. In some implementations, the attempting to verify the MAC is further based on the freshness counter.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, secure onboard communication (SecOC) is an AUTomotive Software Architecture (AUTOSAR) protocol where data being transmitted between electronic control units (ECUs) is appended with a message authentication code (MAC), which can be based on a symmetric or asymmetric key pair. The receiving ECU uses the known key pair to authenticate the source (the sending ECU) of the MAC-appended data and the data's integrity. The data being transmitted between ECUs, however, is still visible to third parties (e.g., a "man-in-the-middle") and thus conventional AUTOSAR SecOC communications are not fully secure. This could become problematic as the number of vehicle ECUs increases and as more private user data is known and shared by the ECUs.

Accordingly, an enhanced vehicle SecOC protocol with encryption is presented herein. By encrypting the data being transmitted to ECUs, the data is no longer interpretable by a third party because they do not know the encryption key pair. Thus, private user data being shared between ECUs in a vehicle is more secure. In one exemplary implementation, the same symmetric or asymmetric key pair that is used to calculate/append and verify the MAC is also used for the data encryption/decryption. This will mitigate any increased overhead or processing costs because there is no additional key negotiation that must be performed between the sending/receiving ECUs.

Figure 1:
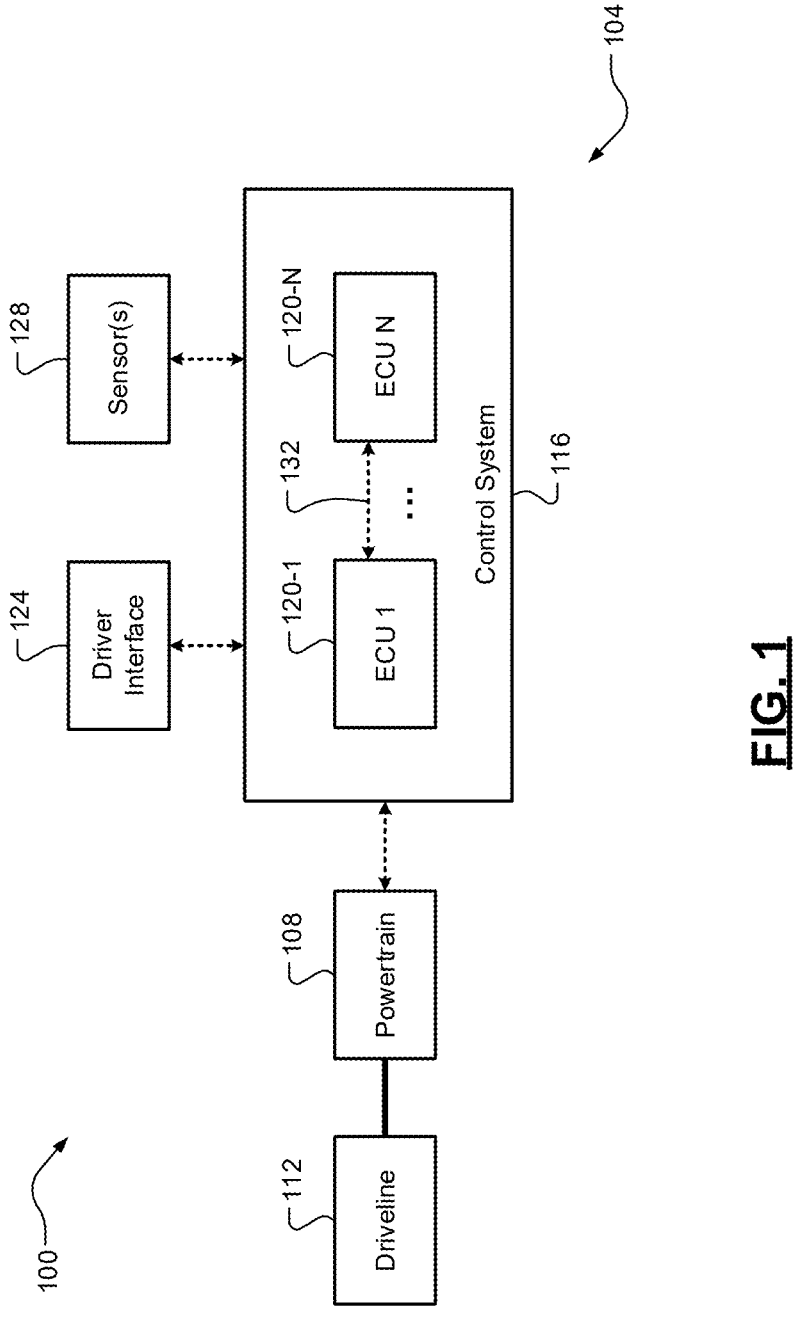
FIG. 1 is a functional block diagram of a vehicle having an example control system configured for secure onboard communication (SecOC) according to the principles of the present application.

Referring now to FIG. 1, a functional block diagram of a vehicle 100 having an example control system 104 according to the principles of the present application is illustrated. The vehicle 100 generally comprises a powertrain 108 configured to generate and transfer drive torque to a driveline 112 for vehicle propulsion. Non-limiting examples of the components of the powertrain 108 include an internal combustion engine, one or more electric motors, a high voltage battery pack or system, a multi-speed automatic or continuously variable transmission (CVT), and any combinations thereof. Operation of the vehicle 100 is controlled by a control system 116, which includes a plurality of controllers or ECUs 120-1 . . . 120-N (N being an integer greater than one; collectively, "ECUs 120").

Primarily, the control system 116 controls the powertrain 108 to generate and transfer a desired amount of drive torque to the driveline 112 to satisfy a driver torque request received from a driver of the vehicle 100 via a driver interface 124 (e.g., an accelerator pedal). The control system 116 receives measurements (speeds, torques, pressures, temperatures, etc.) from a set of one or more sensors 128 as part of its control processes. The control system 116 is also configured to send/receive messages between the ECUs 120 via a controller area network (CAN, 132) according to the techniques of the present application, which will now be described in greater detail.

Figure 2:
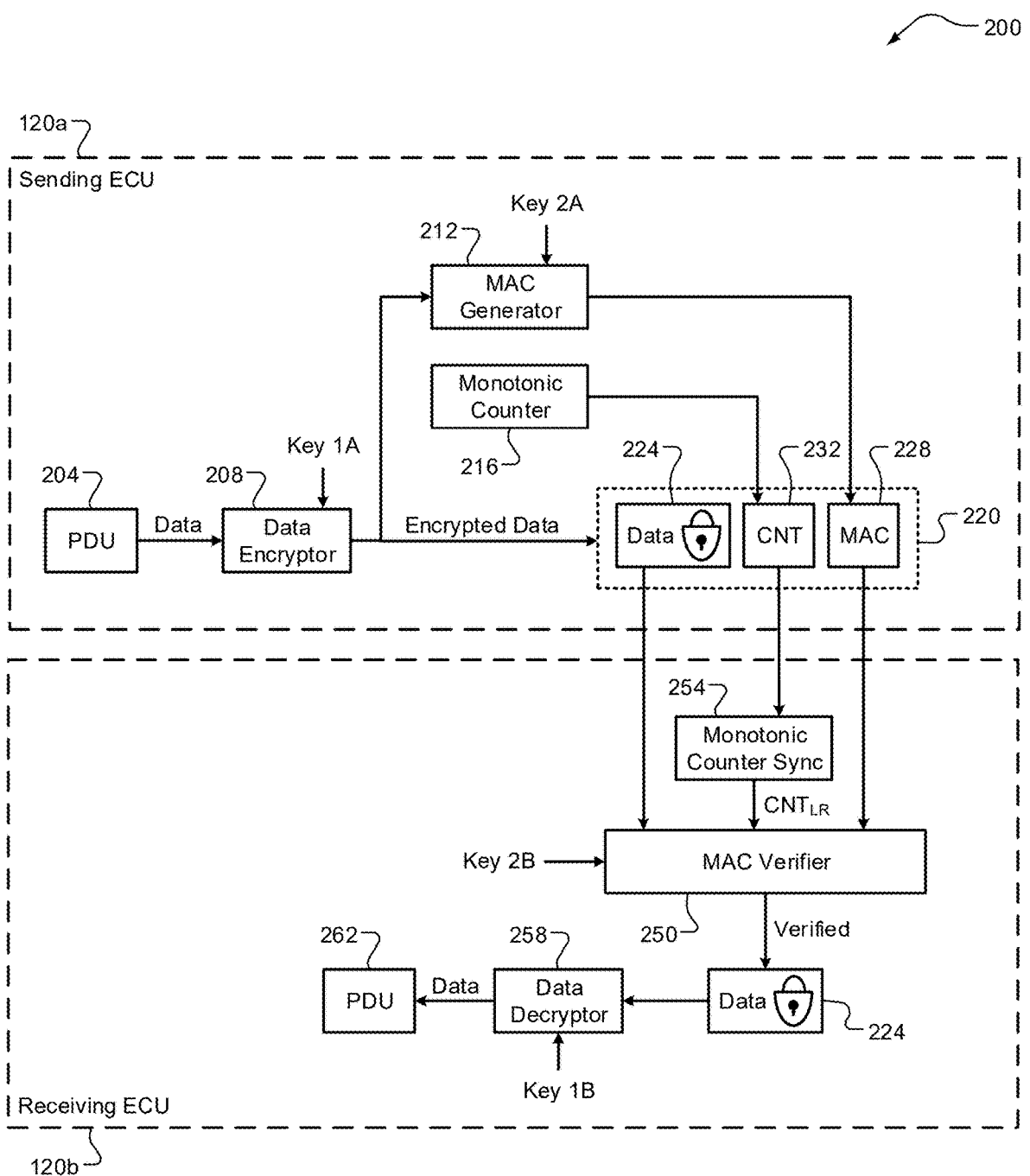
FIG. 2 is a functional block diagram of an example software architecture for a control system configured for SecOC according to the principles of the present application.

Referring now to FIG. 2 and with continued reference to FIG. 1, a functional block diagram of an example software architecture 200 for the control system 116 according to the principles of the present application is illustrated. As shown, the software architecture 200 is split between two of the ECUs 120: a first (sending) ECU 120a and a second (receiving) ECU 120b. In the sending ECU 120a, a first protocol data unit (PDU) provides data for transmission via the CAN 132. As previously mentioned, this data could be or include private user data. Non-limiting examples of private user data include a name, an address, a telephone number, or merely preferences of a particular user.

The PDU 204 provides the data to a data encryptor 208, which uses a first (secret/private) key (Key 1A) of a first key pair (Key Pair 1) to encrypt the data and obtain encrypted data. This encryption could be performed using any suitable encryption algorithm or technique. A MAC generator 212 is also configured to generate a MAC using a second (secret/private) key (Key 1B) of a second key pair (Key Pair 2). In some implementations, a freshness counter is provided by a monotonic counter 216 as part of the AUTOSAR SecOC protocol. A data packet 220 for transmission via the CAN 132 is formed including the encrypted data 224 with a MAC 228 appended thereto and, in some implementations, a freshness counter value (CNT) 232.

In the receiving ECU 120b, the data packet 220 is received via the CAN 132. Specifically, a MAC verifier 250 receives the encrypted data 224 with the MAC 228 appended thereto. In some implementations, the freshness counter value CNT 232 is received by a monotonic counter sync 254, which in turn outputs a last received freshness counter value ($CNT_{LR}$) to the MAC verifier 250. This freshness counter is used, for example, to prevent or filter out receipt of older MAC-appended messages by the receiving ECU 120b. The MAC verifier 250 also receives a second (secret/private) key (Key 2B) of the second key pair Key Pair 2, which could be a symmetric or asymmetric pair with the first key Key 2A of the second key pair Key Pair 2. The MAC verifier attempts to verify the MAC 228 using the second key Key 2B. When verified, the encrypted data 224 is output (e.g., with the MAC 228 removed therefrom) for subsequent decryption.

More specifically, the encrypted data 224 is provided to a data decryptor 258, which uses a second (secret/private) key 1B of the first key pair Key Pair 1 to decrypt the encrypted data and obtains the data. This second key Key 1B of the first key pair Key Pair 1 could be, for example, a symmetric or asymmetric pair with the first key Key 1A of the first key pair Key Pair 1. The decryption could be performed using any suitable decryption algorithm or technique (e.g., based on the previously-utilized encryption algorithm or technique). The data is finally provided to a second PDU 262 of the receiving ECU 120b for further handling/processing.

Figure 3:
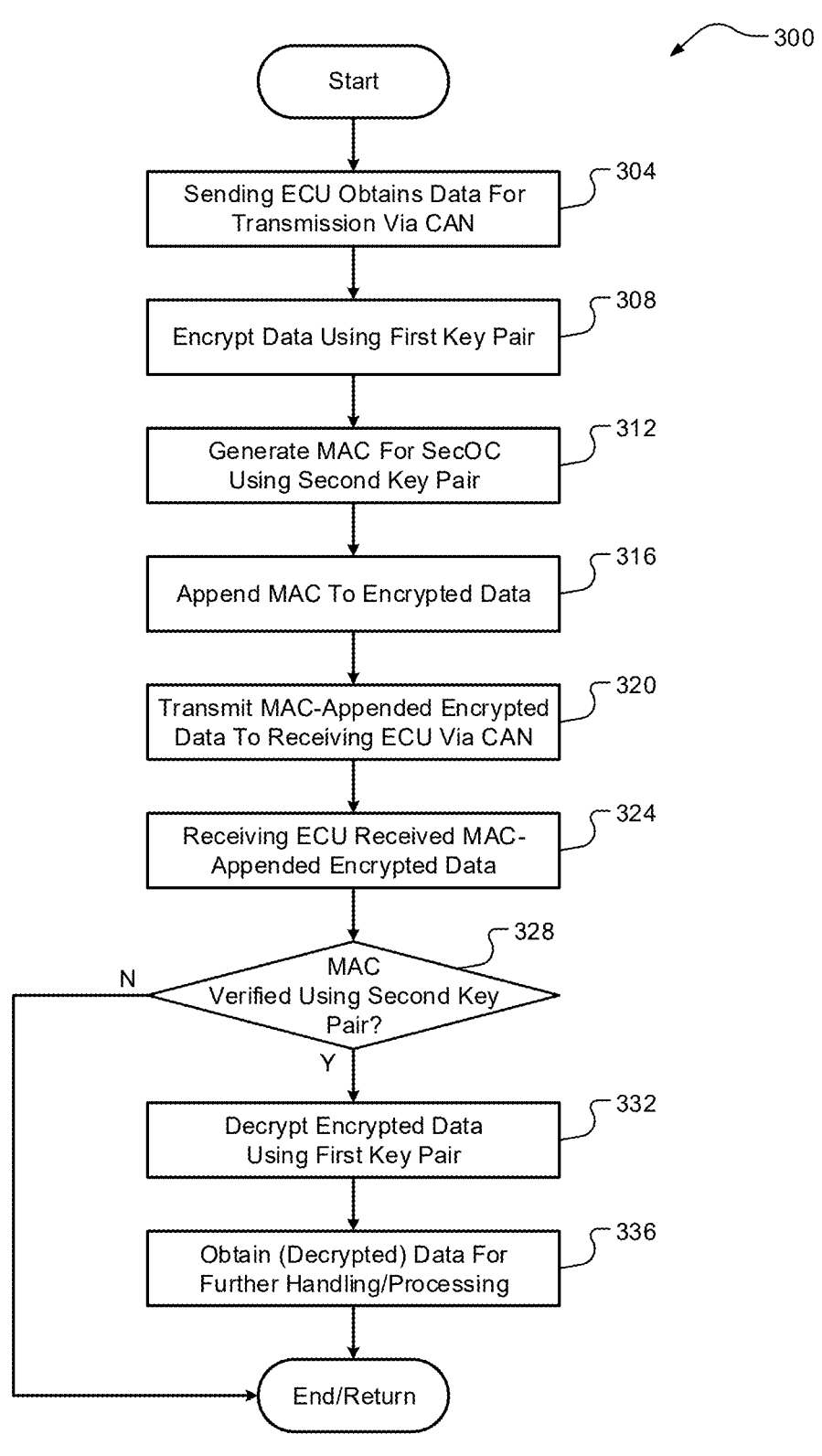
FIG. 3 is a flow diagram of an example method for operating a control system of a vehicle configured for SecOC according to the principles of the present application.

Referring now to FIG. 3 and with continued reference to FIGS. 1-2, a flow diagram of an example method 300 of operating a control system of a vehicle according to some implementations of the present application is illustrated. While the components of the vehicle 100 and/or the software architecture 200 are referenced for descriptive/illustrative purposes, it will be appreciated that the method 300 could be applicably to any suitably configured vehicle control system. The method 300 begins at 304 where the sending ECU 120a obtains data for transmission to the receiving ECU 120b via the CAN 132. This data, as previously described, could be or include private user data. At 308, the sending ECU 120a encrypts the data using a first key pair to obtain encrypted data. At 312, the sending ECU 120a uses a second key pair to generate a MAC for authentication/verification of the data by the receiving ECU 120b (e.g., as part of the AUTOSAR SecOC protocol). This could also include generating a freshness counter value CNT.

At 316, the sending ECU 120a appends the MAC (and in some cases, the freshness counter value CNT) to the encrypted data to obtain MAC-appended encrypted data (e.g., data packet 120). At 320, the sending ECU 120a transmits the MAC-appended encrypted data to the receiving ECU 120b via the CAN 132. At 324, the receiving ECU 120b receives the MAC-appended encrypted data from the sending ECU 120a via the CAN 132. At 328, the receiving ECU 120b attempts to verify the MAC using the second key pair. As previously mentioned, the first and second key pairs may be the same symmetric or asymmetric key pair. This could also involve verifying that the freshness counter value CNT indicates that the MAC-appended encrypted data is not too old/stale for verification. When verified, the method 300 proceeds to 332. When not verified, the method 300 ends or returns to 304. For example, the MAC-appended encrypted data could be discarded. At 332, the receiving ECU 120b decrypts the encrypted data using the first key pair. At 336, the receiving ECU 120b obtains the data, which could then be provided for further handling/processing. The method 300 then ends or returns to 304 for one or more cycles.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle, the control system comprising:
   a first electronic control unit (ECU) configured to obtain data for communication to another ECU of the vehicle and to:
      encrypt the data using a first key pair to obtain encrypted data,
      calculate a message authentication code (MAC) using a second key pair,
      append a freshness counter along with the MAC to the encrypted data to obtain a MAC-appended encrypted data, wherein the appended freshness counter and the MAC are un-encrypted, and
      transmit the MAC-appended encrypted data via a controller area network (CAN) of the vehicle; and
   a second ECU configured to receive the MAC-appended encrypted data from the first ECU via the CAN and to:
      using the second key pair, attempt to verify the MAC based on the freshness counter and obtain the encrypted data from the MAC-appended encrypted data received from the first ECU, and
      in response to verifying the MAC using the second key pair, decrypt the encrypted data using the first key pair to obtain the data.

2. The control system of claim 1, wherein the first and second key pairs are a same key pair such that there is no additional key negotiation between the first and second ECUs.

3. The control system of claim 2, wherein the first and second key pairs are a same symmetric key pair.

4. The control system of claim 2, wherein the first and second key pairs are a same asymmetric key pair.

5. The control system of claim 1, wherein the MAC-appended encrypted data is visible to a third party that does not have the first key pair.

6. The control system of claim 5, wherein the data includes private user data for a user associated with the vehicle, and wherein the encryption of the data prevents the third party from obtaining the private user data.

7. The control system of claim 1, wherein the calculating, appending, and verification of the MAC is based on the AUTOSAR secure onboard communication (SecOC) protocol.

8. A method of operating a control system for a vehicle, the method comprising:
   obtaining, by a first electronic control unit (ECU) of the vehicle, data for communication to another ECU of the vehicle;
   encrypting, by the first ECU, the data using a first key pair to obtain encrypted data;
   calculating, by the first ECU, a message authentication code (MAC) using a second key pair;
   appending, by the first ECU, a freshness counter along with the MAC to the encrypted data to obtain a MAC-appended encrypted data, wherein the appended freshness counter and the MAC are un-encrypted;
   transmitting, from the first ECU via a controller area network (CAN) of the vehicle, the MAC-appended encrypted data;
   receiving, by a second ECU and from the first ECU via the CAN, the MAC-appended encrypted data;
   using the second key pair, by the second ECU, attempting to verify the MAC based on the freshness counter and obtain the encrypted data from the MAC-appended encrypted data received from the first ECU; and
   in response to verifying the MAC using the second key pair, decrypting, by the second ECU, the encrypted data using the first key pair to obtain the data.

9. The method of claim 8, wherein the first and second key pairs are a same key pair such that there is no additional key negotiation between the first and second ECUs.

10. The method of claim 9, wherein the first and second key pairs are a same symmetric key pair.

11. The method of claim 9, wherein the first and second key pairs are a same asymmetric key pair.

12. The method of claim 8, wherein the MAC-appended encrypted data is visible to a third party that does not have the first key pair.

13. The method of claim 12, wherein the data includes private user data for a user associated with the vehicle, and wherein the encryption of the data prevents the third party from obtaining the private user data.

14. The method of claim 8, wherein the calculating, appending, and verification of the MAC is based on the AUTOSAR secure onboard communication (SecOC) protocol.

* * * * *